(12) United States Patent
Yue et al.

(10) Patent No.: US 11,693,843 B2
(45) Date of Patent: Jul. 4, 2023

(54) DATA PROCESSING METHOD AND SYSTEM OF A DISTRIBUTED GRAPH DATABASE

(71) Applicant: Vesoft Inc., Hangzhou (CN)

(72) Inventors: Tong Yue, Hangzhou (CN); Bosheng Chen, Hangzhou (CN); Xiaomeng Ye, Hangzhou (CN)

(73) Assignee: VESOFT INC, Zhejiang (CN)

( * ) Notice: Subject to any disclaimer, the term of this patent is extended or adjusted under 35 U.S.C. 154(b) by 11 days.

(21) Appl. No.: 17/303,669

(22) Filed: Jun. 4, 2021

(65) Prior Publication Data

US 2022/0067011 A1 Mar. 3, 2022

(30) Foreign Application Priority Data

Aug. 31, 2020 (CN) .......................... 202010899494.7
Sep. 18, 2020 (CN) .......................... 202010984750.2

(51) Int. Cl.
| | | |
|---|---|---|
| G06F 16/00 | (2019.01) | |
| G06F 16/23 | (2019.01) | |
| G06F 16/27 | (2019.01) | |
| G06F 16/248 | (2019.01) | |
| G06F 16/28 | (2019.01) | |
| G06F 16/22 | (2019.01) | |

(52) U.S. Cl.
CPC ........ G06F 16/235 (2019.01); G06F 16/2365 (2019.01); G06F 16/248 (2019.01); G06F 16/278 (2019.01); G06F 16/28 (2019.01); G06F 16/2255 (2019.01)

(58) Field of Classification Search
CPC .. G06F 16/2255; G06F 16/235; G06F 16/278; G06F 16/2365; G06F 16/248
USPC .................................................. 707/600–899
See application file for complete search history.

(56) References Cited

U.S. PATENT DOCUMENTS

| | | | |
|---|---|---|---|
| 10,810,179 B2 * | 10/2020 | Risvik | .................... G06F 16/27 |
| 2017/0364534 A1 * | 12/2017 | Zhang | ................... G06F 16/284 |
| 2018/0081937 A1 * | 3/2018 | Broecheler | ......... G06F 16/2322 |
| 2019/0171736 A1 * | 6/2019 | Lee | .................. G06F 16/24575 |
| 2019/0294733 A1 * | 9/2019 | Scheideler | .......... G06F 16/9024 |
| 2019/0295078 A1 * | 9/2019 | Bae | ..................... G06F 16/1824 |
| 2020/0409931 A1 * | 12/2020 | Zang | ..................... G06F 16/212 |
| 2022/0067011 A1 * | 3/2022 | Yue | .................... G06F 16/2255 |

* cited by examiner

*Primary Examiner* — Michelle N Owyang
(74) *Attorney, Agent, or Firm* — Ziegler IP Law Group LLC

(57) ABSTRACT

The present application relates to a data processing method and system of a distributed graph database. The present application solves the problem of how to improve the efficiency of adding, deleting, modifying and checking data in a graph database, realizes balanced storage and concurrent computing of distributed index, reduces network overhead caused by data operation, and improves the efficiency of data operation effectively.

7 Claims, 6 Drawing Sheets

DATA PROCESSING METHOD AND SYSTEM OF A DISTRIBUTED GRAPH DATABASE

CROSS-REFERENCE TO RELATED APPLICATIONS

The present application claims priority to the benefit of Chinese Patent Application No. 201710277172.7, filed on Aug. 31, 2020, and Chinese Patent Application No. 202010984750.2, filed on Sep. 18, 2020. All aforementioned patent applications are hereby incorporated by reference in their entireties.

FIELD OF THE INVENTION

The present invention relates the technical field of graph databases, in particular to a data processing method and system of a distributed graph database.

BACKGROUND OF THE INVENTION

The rise of such industries as retail, finance, e-commerce, Internet, and Internet of Things (IoT) has witnessed an exponential growth of fundamental data. In order to organize rapidly growing data into a well-connected network, a graph database based on graph structures has gradually become a hot spot in big data processing. However, in the face of exponential growth data, how to improve the efficiency of adding, deleting, modifying and checking data in the graph database has become a problem that needs to be solved urgently.

At present, there is no effective solution to the problem of how to improve the efficiency of adding, deleting, modifying and checking data in the graph database.

SUMMARY OF THE INVENTION

In order to solve the problems of how to improve the efficiency of adding, deleting, modifying and checking data in a graph database in the prior art, the present invention provides a data processing method and system of a distributed graph database.

In a first aspect, an embodiment of the present application provides a data processing method of a distributed graph database, and the method comprises:

obtaining a write request of a vertex or an edge;

generating a vertex index of the vertex according to a tagID of the vertex, wherein, the vertex includes a vertexID and the tagID; writing the vertex and the vertex index into a same graph partition and storing the vertex and the vertex index in the graph partition by performing a hash operation on the vertexID;

generating an edge index of the edge according to an edgetype of the edge, wherein, the edge includes a source vertexID and the edgetype; writing the edge and the edge index into a same graph partition by performing a hash operation on the source vertexID and storing the edge and the edge index in the graph partition;

obtaining a data update request of the vertex or the edge, wherein, the data update request comprises a data record to be updated and data update information;

detecting whether the data record is valid;

returning update failure information if the data record is invalid;

updating the vertex or the edge according to the data update information if the data record is valid.

In some of the embodiments, the step of generating a vertex index of the vertex according to a tagID of the vertex and the step of generating an edge index of the edge according to an edgetype of the edge may comprise:

creating a vertex indexID according to the tagID on the basis of the a tag schema, wherein, the vertex index comprises the vertex indexID, a graph partitionID, a data type and a property;

creating an edge indexID according to the edgetype on the basis of an edge schema, wherein, the edge index comprises the edge indexID, a graph partitionID, a data type and a property.

In some of the embodiments, the step of detecting whether the data record is valid may comprise:

detecting whether the data record exists;

determining whether the data record has expired if the data record exists;

determining the data record is valid if the data record exists and the data record has not expired;

determining the data record is invalid if the data record does not exist or the data record has expired.

In some of embodiments, the step of detecting whether the data record is valid; and the step of updating the vertex or the edge according to the data update information if the data record is valid may comprise:

detecting whether the data record is valid;

determining whether the data record meets a preset filter condition if the data record is valid;

returning filtering failure information if the data record does not meet the preset filter condition;

updating the vertex or the edge according to the data update information if the data record meets the preset filter condition.

In some embodiments, the step of obtaining a data update request of the vertex or the edge and the step of updating the vertex or the edge according to the data update information may comprise:

determining a graph partition of the data update request by performing a hash operation on the vertexID or the source vertexID after obtaining a data update request of the vertex or the edge;

updating the vertex and the vertex index by the graph partition sequentially according to the data update information; or updating the edge and the edge index by the graph partition sequentially according to the data update information.

In some embodiments, before the step of updating the vertex or the edge according to the data update information, the method may further comprise:

detecting whether vertex index information or edge index information exists in the data update request;

updating the vertex index information or the edge index information synchronously if the vertex index information or the edge index information exists;

skipping updating the vertex index information or the edge index information if the vertex index information or the edge index information does not exist.

In some embodiments, the data update request may comprise the data record to be updated and data update information, and the method may comprise:

if the data record is an edge update record, when it is determined that the edge has a related edge, updating data of the edge according to the data update information, and updating the related edge synchronously by the edge update record.

In some embodiments, after the step of writing the vertex and the vertex index into same graph partition or the step of writing the edge and the edge index into a same graph partition, the method may further comprise:

obtaining a data query request sent by an API Client, verifying the validity of the data query request by calling a Metadata Server, sending the data query request to a graph partition in a storage server by a Storage Client, performing parallel index scanning on the graph partition according to the data query request, wherein, a query range of the data query request is determined by a graph partitionID and the tagID, or determined by a graph partitionID and the edgetype;

obtaining result set by querying the storage server, summarizing the result set and returning summarized result set to the API Client.

In some embodiments, the step of performing parallel index scanning on the graph partition according to the data query request may comprise:

generating an Error Code by the storage server when an error occurs in performing parallel index scanning on the graph partition;

locating the graph partition where the error occurs in the index scan according to the Error Code.

In some embodiments, after the step of writing the vertex and the vertex index into same graph partition or the step of writing the edge and the edge index into same graph partition, the method may further comprise:

obtaining a data deletion request;

determining a graph partition for the data deletion request by performing a hash operation on the vertexID of the vertex or the source vertexID of the edge of the data deletion request;

obtaining preset deletion data in the data deletion request in the graph partition according to the vertexID of the vertex or the edge type of the edge;

performing atomic deletion operation on the preset deletion data.

In a second aspect, an embodiment of the present application provides a data processing system of a distributed graph database, and the system comprises graph server, meta server and storage server; wherein the graph server obtains a write request of a vertex or an edge;

the meta server generates a vertex index of the vertex according to a tagID of the vertex, wherein, the vertex comprises a vertexID and the tagID, and writes the vertex and the vertex index into a same graph partition by performing a hash operation on the vertexID;

the storage server stores the vertex and the vertex index in the graph partition;

the meta server generates an edge index of the edge according to an edgetype of the edge, wherein, the edge comprises a source vertexID and the edgetype, and writes the edge and the edge index into a same graph partition by performing a hash operation on the source vertexID;

the storage server stores the edge and the edge index in the graph partition;

the graph server obtains a data update request of the vertex or the edge, wherein, the data update request includes a data record to be updated and data update information;

the storage server detects whether the data record is valid;

the storage server returns update failure information if the data record is invalid;

the storage server updates the vertex or the edge according to the data update information if the data record is valid.

In some embodiments, that the meta server generates a vertex index of the vertex according to a tagID of the vertex and the meta server generates an edge index of the edge according to an edgetype of the edge may comprise:

the meta server creates a vertex indexID according to the tagID on the basis of a tag schema, wherein, the vertex index comprises the vertex indexID, a graph partitionID, a data type and a property;

the meta server creates an edge indexID according to the edgetype on the basis of an edge schema, wherein, the edge index comprises the edge edge indexID, a graph partitionID, a data type and a property.

In some embodiments, that the storage server detects whether the data record is valid may comprise:

the storage server detects whether the data record exists;

the storage server determines whether the data record has expired if the data record exists;

the storage server determines the data record is valid if the data record exists and the data record has not expired;

the storage server determines the data record is invalid if the data record does not exist or the data record has expired.

In some embodiments, that the storage server detects whether the data record is valid, the storage server updates the vertex or the edge according to the data update information if the data record is valid includes:

the storage server detects whether the data record is valid;

the storage server determines whether the data record meets a preset filter condition if the data record is valid;

the storage server returns filtering failure information if the data record does not meet the preset filter condition;

the storage server updates the vertex or the edge according to the data update information if the data record meets the preset filter condition.

In some embodiments, that the graph server obtains a data update request of the vertex or the edge, the storage server updates the vertex or the edge according to the data update information if the data record is valid may comprise:

the graph server determines a graph partition of the data update request by performing a hash operation on the vertexID or the source vertexID after obtaining a data update request of the vertex or the edge;

the storage server updates the vertex and the vertex index by the graph partition sequentially according to the data update information; or the storage server updates the edge and the edge index by the graph partition sequentially according to the data update information.

In some embodiments, before the storage server updates the vertex or the edge according to the data update information, and the system may further comprise:

the storage server detects whether vertex index information or edge index information exists in the data update request;

the storage server updates the vertex index information or the edge index information synchronously while the vertex index information or the edge index information exists;

the storage server does not update the vertex index information or the edge index information if the vertex index information or the edge index information does not exist.

In some embodiments, the data update request comprises data record to be updated and data update information, the system may comprise:

if the data record is an edge update record, when it is determined that the edge has a related edge, the storage server updates data of the edge according to the data update information, and updates the related edge synchronously by the edge update record.

In some embodiments, after the meta server writes the vertex and the vertex index into a same graph partition and writes the edge and the edge type into a same graph partition, the system further includes:

the graph server obtains a data query request sent by an API Client;

the Mega Server verifies the validity of the data query request;

the Mega Server sends the data query request to a graph partition in storage server by a Storage Client;

the storage server performs parallel index scanning on the graph partition according to the data query request, wherein, a query range of the data query request is determined by a graph partitionID and the tagID, or determined by a graph partitionID and the edgetype;

the graph server obtains result set by querying the storage server, summarizes the result set and returns summarized result set to the API Client.

In some embodiments, that the storage server performs parallel index scanning on the graph partition according to the data query request may comprise:

the storage server generates an Error Code when an error occurs in performing parallel index scanning on the graph partition;

the storage server locates the graph partition where the error occurs in the index scan according to the Error Code.

In some embodiments, after the meta server writes the vertex and the vertex index into a same graph partition and writes the edge and the edge type into a same graph partition, the system may further comprise:

the graph server obtains a data deletion request;

the Mega Server determines a graph partition for the data deletion request by performing a hash operation on the vertexID of the vertex or the source vertexID of the edge of the data deletion request;

the Mega Server obtains a preset deletion data in the data deletion request in the graph partition according to the vertexID of the vertex or the edgetype of the edge;

the Mega Server performs atomic deletion operation on the preset deletion data.

The present invention provides a data processing method and system of a distributed graph database, obtaining a write request of a vertex or an edge; generating a vertex index of the vertex according to a tagID of the vertex, wherein, the vertex comprises a vertexID and the tagID, writing the vertex and the vertex index into a same graph partition by performing a hash operation on the vertexID and storing the Vertex and the vertexID in the graph partition; generating an edge index of the edge according to an edgetype of the edge, wherein, the edge comprises a source vertexID and the edgetype, writing the edge and the edge index into a same graph partition by performing a hash operation on the source vertexID and storing the edge and the edge index in the graph partition; obtaining a data update request of the vertex or the edge, wherein, the data update request comprises a data record to be updated and data update information; detecting whether the data record is valid; returning update failure information if the data record is invalid; updating the vertex or the edge according to the data update information if the data record is valid. The present invention solves the problem of how to improve the efficiency of adding, deleting, modifying and checking data in a graph database, realizes balanced storage of distributed index and concurrent computing, reduces network overhead caused by data operation, and improves the efficiency of data operation effectively.

BRIEF DESCRIPTION OF THE DRAWINGS

The drawings described herein are used to provide a further understanding of the present application and constitute a part of the present application. The illustrative embodiments of the present application and the description thereof are used to explain the present application, and do not constitute an improper limitation of the present application. In the drawings.

Figure 1:
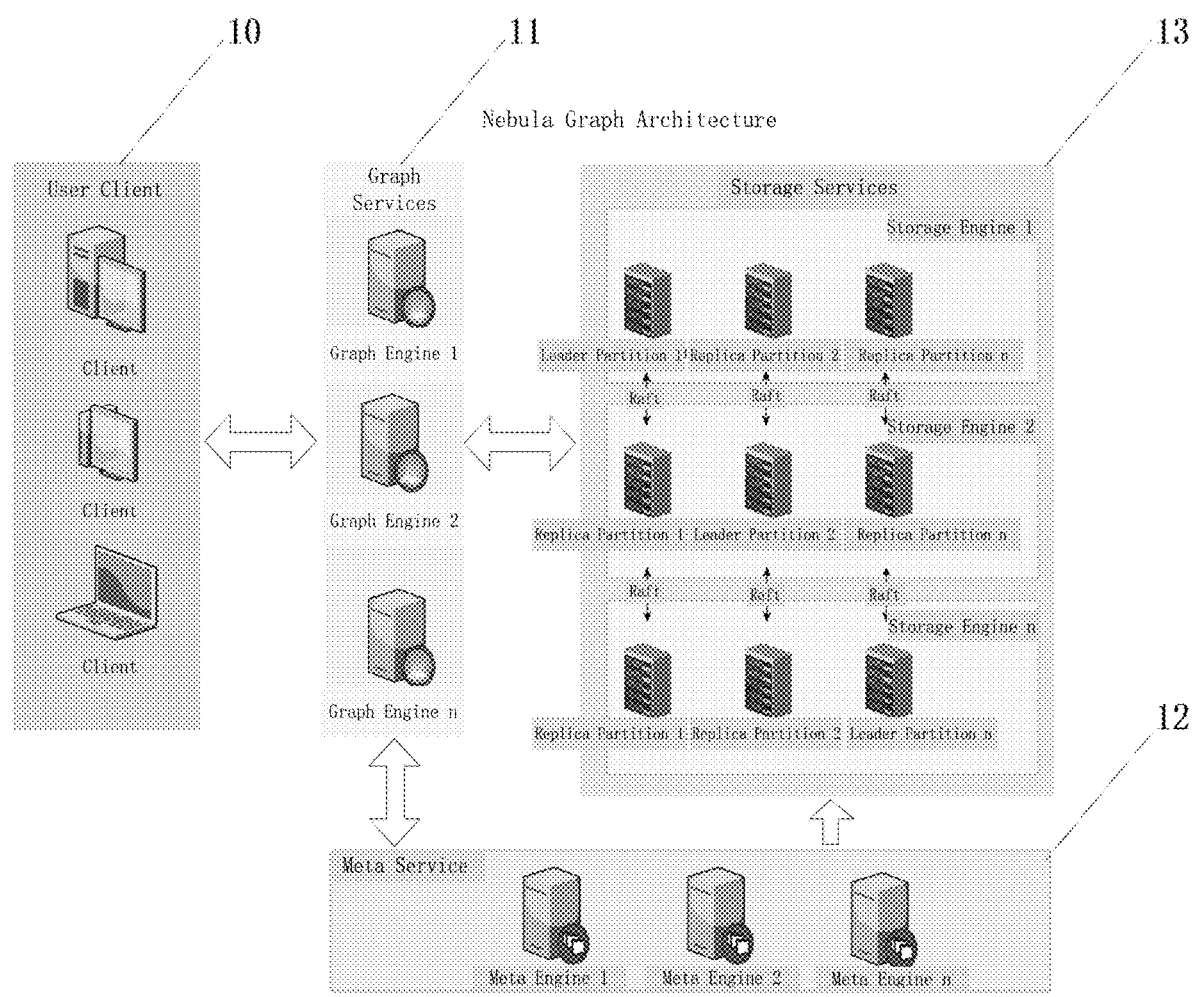
FIG. 1 is a schematic diagram of a distributed architecture of nebula graph according to an embodiment of the present application.

Reference numerals: 10—user client; 11—graph server; 12—meta server; 13—storage server.

DETAILED DESCRIPTION OF THE INVENTION

In order to make the objectives, technical solutions and advantages of the present application clearer, the present application will be described and illustrated below in conjunction with the drawings and embodiments. It should be understood that the specific embodiments described herein are only used to explain the present application, and are not used to limit the present application. Based on the embodiments provided in the present application, all other embodiments obtained by persons of ordinary skill in the art without creative efforts shall still fall within the protection scope of the present application.

Obviously, the drawings in the following description are only some examples or embodiments of the present application. For persons of ordinary skill in the art, the present application can be applied to other similar scenarios according to these drawings while without creative efforts. In addition, it is also understandable that although the efforts made in this development process may be complicated and lengthy. However, for persons of ordinary skill in the art related to the content disclosed in the present application, some design, manufacturing and production changes based on the technical content disclosed in the present application are just conventional technical means, and should not be understood that the content disclosed in the present application is insufficient.

"Embodiments" referred in the present application means that specific feature, structure or characteristic described in conjunction with the embodiments may be included in at least one embodiment of the present application. The appearance of the phrase in various places in the description does not necessarily refer to the same embodiment, nor is it an independent or alternative embodiment mutually exclusive with other embodiments. Persons of ordinary skill in the art clearly and implicitly understand that the embodiments described in the present application can be combined with other embodiments without conflict.

Unless otherwise defined, the technical terminology or scientific terminology involved in the present application shall have the usual meanings understood by persons of ordinary skill in the technical field of the present application. The "one", "a", "an", "the" and other similar words referred to the present application do not indicate a quantitative limit, and may indicate a singular or plural form. The terminology "include", "comprise", "contain" and any of their variations involved in the present application are intended to cover non-exclusive inclusion; for example, process, method, system, product or device that includes a series of steps or modules (units) is not limited to the listed steps or units, but may also include steps or units that are not listed, or may also include other steps or units inherent to these process, method, product or device. The "connect", "connected", "couple" and other similar words referred to the present application are not limited to physical or mechanical connections, but may include electrical connections, whether direct or in direct. The "plurality" referred to in the present application refers to two or more. "And/or" describes the association relationship of the associated objects, which means that there can be three kinds of relationships, for example, "A and/or B" can mean: A exists alone, A and B exist at the same time, and B exists alone. The character "/" generally indicates that the associated objects before and after are in an "or" relationship. The terminology "first", "second", "third" and the like involved in the present application merely distinguish similar objects, and do not represent a specific ordering of objects.

Before introducing specific embodiments, the technical terminology involved in the embodiments of the present application shall be explained as follows:

nebula graph: an open source distributed graph database, the distributed index technology of the present is an important function of nebula graph;

r agraph: smallest logical unit of a relationship network, which can completely describe the entities and the relationships between entities in the relationship network, and properties attached to the entities and properties attached to the relationships between entities;

vertex: a collective term of entities;

edge: a collective term of relationships between entities;

property: properties attached to vertex or edge, the data type can be INT, BOOL, STRING or DOUBLE and the like;

graph space: it can be understood as storage unit of the relationship network; the graph space is logical storage unit of a graph in the nebula graph;

graph partition: physical storage partition of nebula graph, a graph space contains multiple graph partition, each graph partition contains multiple copies which are distributed on different nodes, and the consistency of graph partition is ensured by the Raft distributed protocol;

graph schema: a collective term of schemas in the graph, it can define logical structure of an entity or relational data storage, for example, "person" as an entity, the related property of the "person" can be defined as a graph schema, which contains property such as: name, age, gender and the like;

tag schema: a subcategory of the graph schema, which is used to define property of entities, tag schema has a globally unique ID, which is tagID;

edge schema: another subcategory of the graph schema, which is used to define property of relationships between entities, for example, relationship between entities "person" can be defined as an edge schema, which contains property such as: relationship (relatives, friends, colleagues, classmates), edge schema has a globally unique ID, which is edge type;

index schema: the index schema is based on the tag schema or the edge schema, which contains one or more property of tag schema or edge schema, the order of property has strict requirements, and different orders of property will result in different index storage, index schema has a unique ID, which is indexID.

An embodiment of the present application provides a data processing system of a distributed graph database. FIG. 1 is a schematic diagram of a distributed architecture of nebula graph according to an embodiment of the present application. As shown in FIG. 1, the cluster architecture of nebula graph is connected to the user client 10, wherein, the cluster architecture of nebula graph is mainly divided into three layers: graph server layer (graph server), meta server layer (meta server) and storage server layer (storage server), each of the above layers can be deployed in a distributed manner, that is, the graph server layer includes several graph servers 11, the meta server layer includes several meta servers 12, the storage server layer includes several Storage Clients and several storage servers 13.

The main function of the graph server layer is grammatical, semantic analysis and control of execution and the like. The main function of the meta server layer is storing graph space, graph partition and metadata information of graph schema, storing information of cluster node and controlling structure of cluster node. The main function of the storage server layer is storing data and index, retrieving data and index and the like. The storage server layer contains multiple logical graph partition, different graph partition are divided into different storage server layer, and strong data consistency between copies of graph partition is ensured by Raft distributed protocol.

Figure 2:
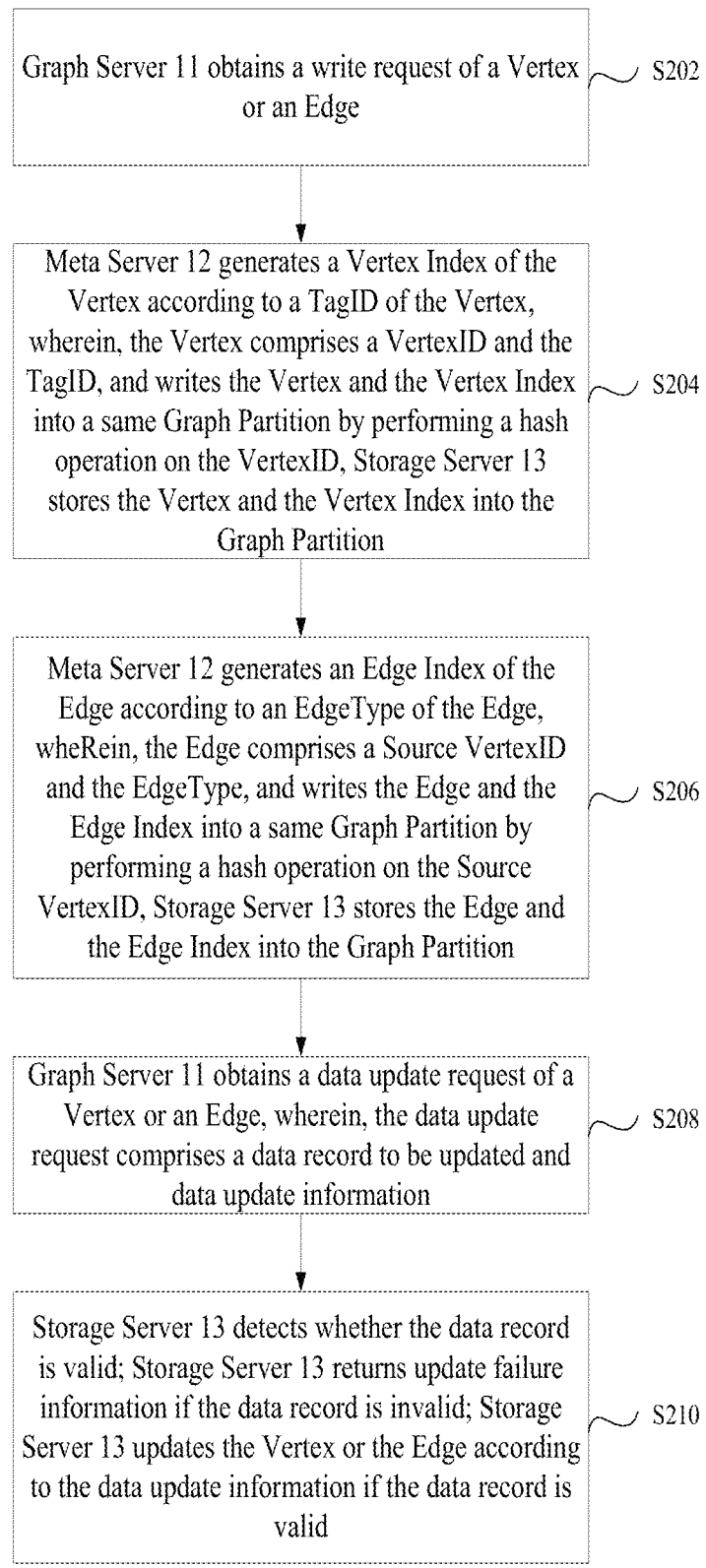
FIG. 2 is a flowchart of a data operation method of a distributed graph database according to an embodiment of the present application.

An embodiment of the present application provides a data processing method of a distributed graph database. FIG. 2 is a flowchart of a data operation method of a distributed graph database according to an embodiment of the present application. As shown in FIG. 2, the method comprises steps as following:

S202, Graph server 11 obtains a write request of a vertex or an edge;

S204, Meta server 12 generates a vertex index of the vertex according to a tagID of the vertex, wherein, the vertex comprises a vertexID and the tagID, and writes the vertex and the vertex index into a same graph partition by performing a hash operation on the vertexID, storage server 13 stores the vertex and the vertex index into the graph partition;

S206, Meta server 12 generates an edge index of the edge according to an edgetype of the edge, wherein, the edge comprises a source vertexID and the edgetype, and writes the edge and the edge index into a same graph partition by performing a hash operation on the source vertexID, storage server 13 stores the edge and the edge index into the graph partition;

S208, Graph server 11 obtains a data update request of a vertex or an edge, wherein, the data update request comprises a data record to be updated and data update information;

S210, Storage server 13 detects whether the data record is valid; storage server 13 returns update failure information if the data record is invalid; storage server 13 updates the vertex or the edge according to the data update information if the data record is valid.

Through the above steps S202 to S210 and graph server 11, meta server 12 and storage server 13, vertex and vertex index are stored in same graph partition, edge and edge type are stored in same graph partition, parallel data update operation can be performed, data security can be ensured by verifying data record. It solves the problem of how to improve the efficiency of adding, deleting, modifying and checking data in graph database, realizes balanced storage and concurrent computing of distributed index, reduces network overhead caused by data operation, and improves the efficiency of data operation of nebula graph.

A specific embodiment of the present application provides a data processing method of a distributed graph database. vertex of nebula graph is composed of Tag and corresponding property. vertex includes at least one kind of Tag, and may include multiple kinds of Tag, the corresponding property of vertex is Schema. edge represents the relationship between Tag of two vertex. edge is composed of edge type and corresponding property, wherein, a set property of edge is Schema. vertex and edge will be modeled as Key-Value data format.

The Key stored by the vertex includes a graph partitionID, a vertexID and a tagID, wherein, the graph partitionID is composed of a 3-byte ID and a 1-byte KeyType. KeyType is the division of data type, such as data, index and the like. graph server 11 can store vertex hash distribution in to different graph partition by performing a hash operation on vertexID. Multiple tag schema can be attached to a vertex, and vertex of different tag schema can be distinguished by tagID.

The Key stored by edge includes graph partitionID, source vertexID, edgetype, edgerank and destination vertexID, wherein, graph partitionID is composed of a 3-byte ID and a 1-byte KeyType. KeyType is the division of data type, such as data, index and the like. graph server 11 can store edge distribution in to different graph partition by performing a hash operation on source vertexID. source vertex and edge can be stored in same graph partition as source vertex hash is the same as edge hash. Multiple edge schema can be attached to an edge, and edge schema can be distinguished by edgetype. edgeRank is rank of edge which is determined by user's input. Destination vertexID is Destination vertexID of edge. Destination vertex may be divided into another graph partition.

The distributed storage of Index is implemented on the basis of vertex storage and edge storage. The vertex index or the edge index includes: a graph partitionID, an indexID and properties. The graph partitionID is composed of a 3-byte ID and a 1-byte DataType. DataType is the division of data type, herein is Index Type. indexID is 4 byte, which is used to distinguish Index of different vertex or edge. tagID or edgetype can be calculated according to indexID as Index is created on the basis tag schema or edge schema. Properties are stored property values, as the bottom layer is based on KV system storage and the bottom layer KV system can sort the property values.

TABLE 1

| vertex | partition ID | Key Type | indexID | Prop |
| --- | --- | --- | --- | --- |
|  | 3 Byte | 1 Byte | 4 Byte | 0 Byte |
| vertex 1 | 1 | Type::Index | 110 |  |
| vertex 2 | 2 | Type::Index | 110 |  |

TABLE 2

| edge | partition ID | Key Type | Index ID | Prop |
| --- | --- | --- | --- | --- |
|  | 3 Byte | 1 Byte | 4 Byte | 0 Byte |
| edge 1 | 1 | Type::Index | 210 |  |
| edge 2 | 2 | Type::Index | 210 |  |

The storage in present application will be described in detail below in conjunction with specific application scenarios.

A graph space is created which contains two graph partition, wherein, the graph space is named space, and graph partitionID are 1 and 2 respectively;

A tag schema is created which has only one column tag_col, string type, wherein, the tag schema is named tag, and tagID is 100;

An edge schema is created which has only one column edge_col, string type, wherein, the edge schema is named edge, and edgetype is 200;

A Tag Index is created according to tag which contains the column tag_col in the tag, wherein, Tag Index is named tag_index, and Tag indexID is 110;

An edge index is created according to edge which contains the column edge_col, wherein, edge index is named edge_index, edge indexID is 210;

In order to illustrate distributed storage, two vertex are inserted and divided into graph partition 1 and graph partition 2 respectively; two vertex will generate one index row respectively while two vertex are inserted, wherein, property is null by default; vertex 1 ID is 1000, vertex 2 ID is 1001; at this point, the structure of Key of index row is shown in Table 1;

Two edge are inserted and divided into graph partition 1 and graph partition 2 respectively according to source vertexID; two edge will generate one index row respectively while two edge are inserted, wherein, edgeRank is 0 by default, property is null by default; edge 1 is the edge from vertex 1 to vertex 2, edge 2 is the edge from vertex 2 to vertex 1; at this point, the structure of Key of index row is shown in Table 2.

In some embodiments, meta server 12 creates vertexvertex indexID according to tagID based on the tag schema, wherein, vertexvertex index includes vertexvertex indexID, graph partitionID, data type and property;

Meta server 12 creates edge indexID according to an edgetype based on the edge schema, wherein, edge index includes edge indexID, graph partitionID, data type and property.

In some embodiments, a vertex of nebula graph will be modeled as a Key-Value record, an edge of nebula graph will be modeled as two Key-Value records, for example:

The Key of vertex is partitionID+vertexID+tagID+Version, the Value of vertex is the value of multiple properties assembled in the order of the Schema;

The Key of edge is partitionID+SrcID+edgetype+edgeRank+EstID+Version, the Value of edge is the value of multiple properties assembled in the order of the Schema.

Graph server 11 obtains a data update request of the vertex or the edge, the data update request comprises a data record to be updated and data update information; storage server 13 detects whether the data record is valid; the storage server 13 returns update failure information if the data record is invalid; the storage server 13 updates the vertex or the edge according to the data update information if the data record is valid.

Vertex is updated by storage server 13: a new Key-Value record is generated according to tag schema of data record and field information to be updated of data update information.

Edge is updated by storage server 13: a new Key-Value record is generated according to edge schema of data record and filed information to be updated of data update information.

In some embodiments, graph server 11 obtains data update information of vertex or edge, wherein, the data update information comprises a data record to be updated and data update information; meta server 12 detects whether data record exists;

Meta server 12 determines whether data record has expired if data record exists.

It should be noted that Time To Live (referred to as TTL) is used to record the time to live of tag schema or edge schema.

Meta server 12 determines whether the data record has expired based on TTL of data record. It is indicated that the data record has expired if TTL has expired, meta server 12 determines the data record is invalid. It is indicated that the data record does not exist when data record does not include TTL, meta server 12 determines data record is invalid.

Meta server 12 determines the data record is valid if data record exists and has not been expired; meta server 12 determines the data record is invalid when data record does not exist or data record has been expired.

In some embodiments, storage server 13 detects whether the data record is valid; storage server 13 determines whether the data record meets a preset filter condition if the data record is valid;

Storage server 13 returns filtering failure information if the data record does not meet the preset filter condition;

Storage server 13 updates the vertex or the edge according to the data update information if the data record meets the preset filter condition.

In some embodiments, storage server 13 determines a graph partition for data update request by performing a hash operation on vertexID or source vertexID after graph server 11 obtains a data update request of the vertex or the edge;

Storage server 13 updates vertex and vertex index by graph partition sequentially according to data update information; or storage server 13 updates edge and edge index by graph partition sequentially according to data update information.

In some embodiments, storage server 13 detects whether vertex index information or edge index information exists in the data update request;

Storage server 13 updates vertex index information or edge index information synchronously when vertex index information or edge index information exists;

Storage server 13 does not update vertex index information or edge index information when vertex index information or edge index information does not exist.

In some embodiments, edge of nebula graph is directed edge which is named outgoing edge and incoming edge respectively; therefore, edgetype includes outgoing edge or incoming edge, wherein, the opposite side of outgoing edge is incoming edge, the opposite side of incoming edge is outgoing edge.

Storage server 13 updates edge according to data update information when storage server 13 determines edge has related edge if the data record is edge update record. Updating related edge synchronously by the edge update record after edge update record is completed as property of outgoing edge and incoming edge of same logical edge are exactly the same. If the edge is incoming edge, updating the corresponding outgoing edge; and, if the edge is outgoing edge, updating the corresponding incoming edge to keep property of outgoing edge and property of incoming edge exactly the same.

Edge is divided into graph partition according to source vertexID. Outgoing edge and incoming edge of same logical edge may be stored into different graph partition, and different graph partition may be stored into different storage server 13. Therefore, distributed transaction is used to ensure that updating property of outgoing edge and updating property of incoming edge are one atomic operation, the reliability of data is ensured by transaction mechanism and locking mechanism.

A specific embodiment of the present application provides a data processing method of a distributed graph database. graph server 11 obtains a data update request of the vertex or the edge, wherein, data update request comprises a data record to be updated and data update information; meta server 12 updates the vertex or the edge according to the data update request, the data update method comprises update vertex/edge and upsert vertex/edge.

Figure 3:
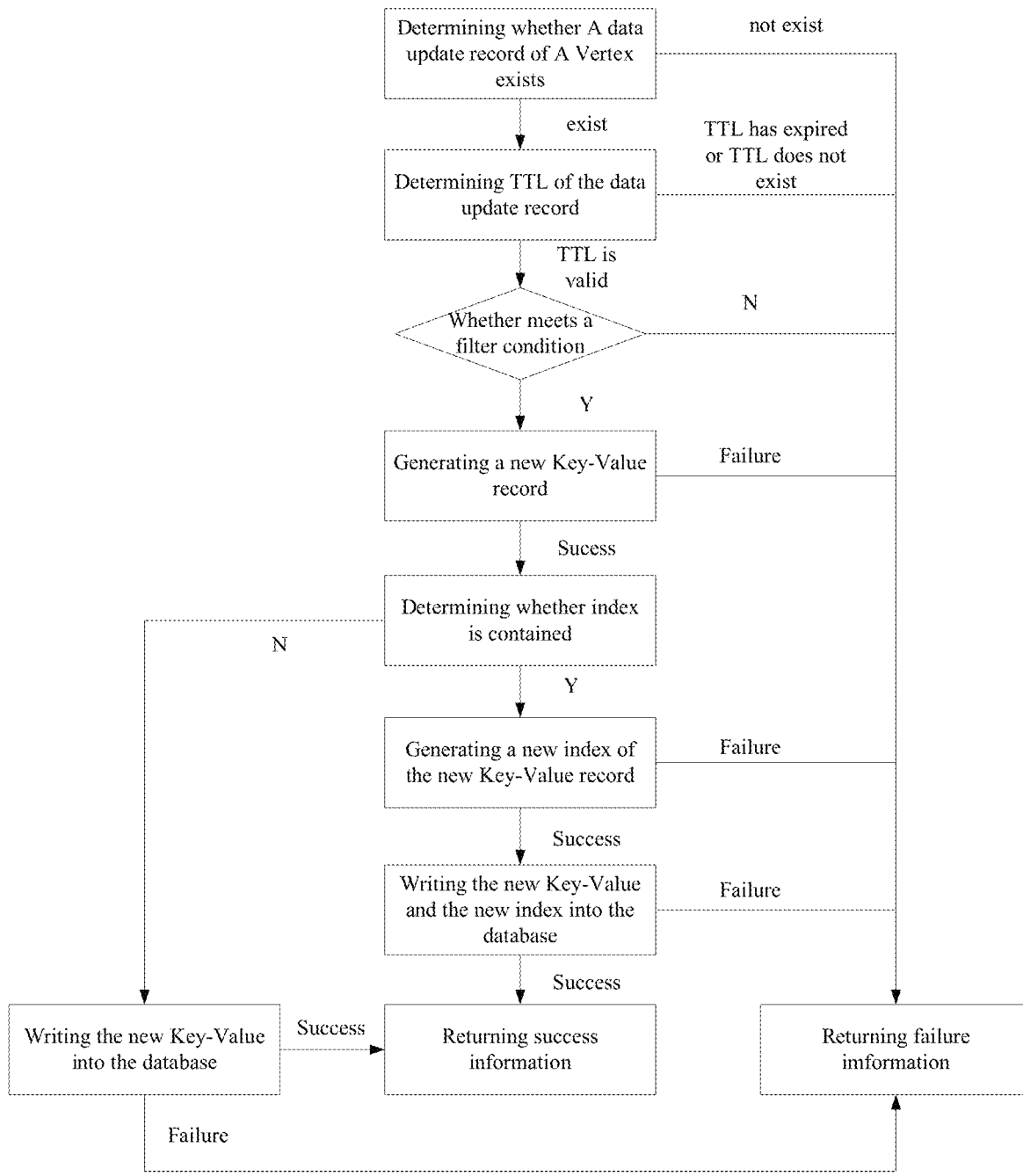
FIG. 3 is a first flowchart of a data update method of a distributed graph database according to an embodiment of the present application.

FIG. 3 is a first flowchart of a data update method of a distributed graph database according to an embodiment of the present application. As shown in FIG. 3, taking update vertex as an example, the steps of update vertex are as follows:

Step 1: Determining whether a data record of a Vertex exists. Reporting an error and returning failure information if the data record does not exist; Performing Step 2 if the data record exists.

Step 2: Determining whether the data record includes TTL. Determining whether the data record has expired if the data record includes TTL. Reporting an error and returning failure information if the data record has expired; Determining the data record is valid and performing Step 3 if the data record has not expired.

Step 3: Determining whether the data record meets a filter condition; reporting an error, returning failure information or returning failure information with filtered information if the data record does not meet the filter condition; Performing Step 4 if the data record meets filter condition.

Step 4: Generating a new Value according to a tag schema of the data record, field information to be updated of data update information and original Value. Combing original Key and new Value into a new Key-Value record.

Step 5: Deleting an original vertex index and inserting a new vertex index of a new Key-Value record while the original vertex comprises a vertex index, writing a new vertex index together with the new Key-Value record which is generated in Step 4 into database. Writing the new Key-Value record into database which is generated in Step 4 if the original data record does not include the vertex index.

Step 6: If Step 5 is successful, returning update success information and property which needs to be returned while update is successful, otherwise, returning failure information.

The entire processing step is a read_modify_write process, wherein, the reliability of data is ensured by transaction mechanism and locking mechanism.

Figure 4:
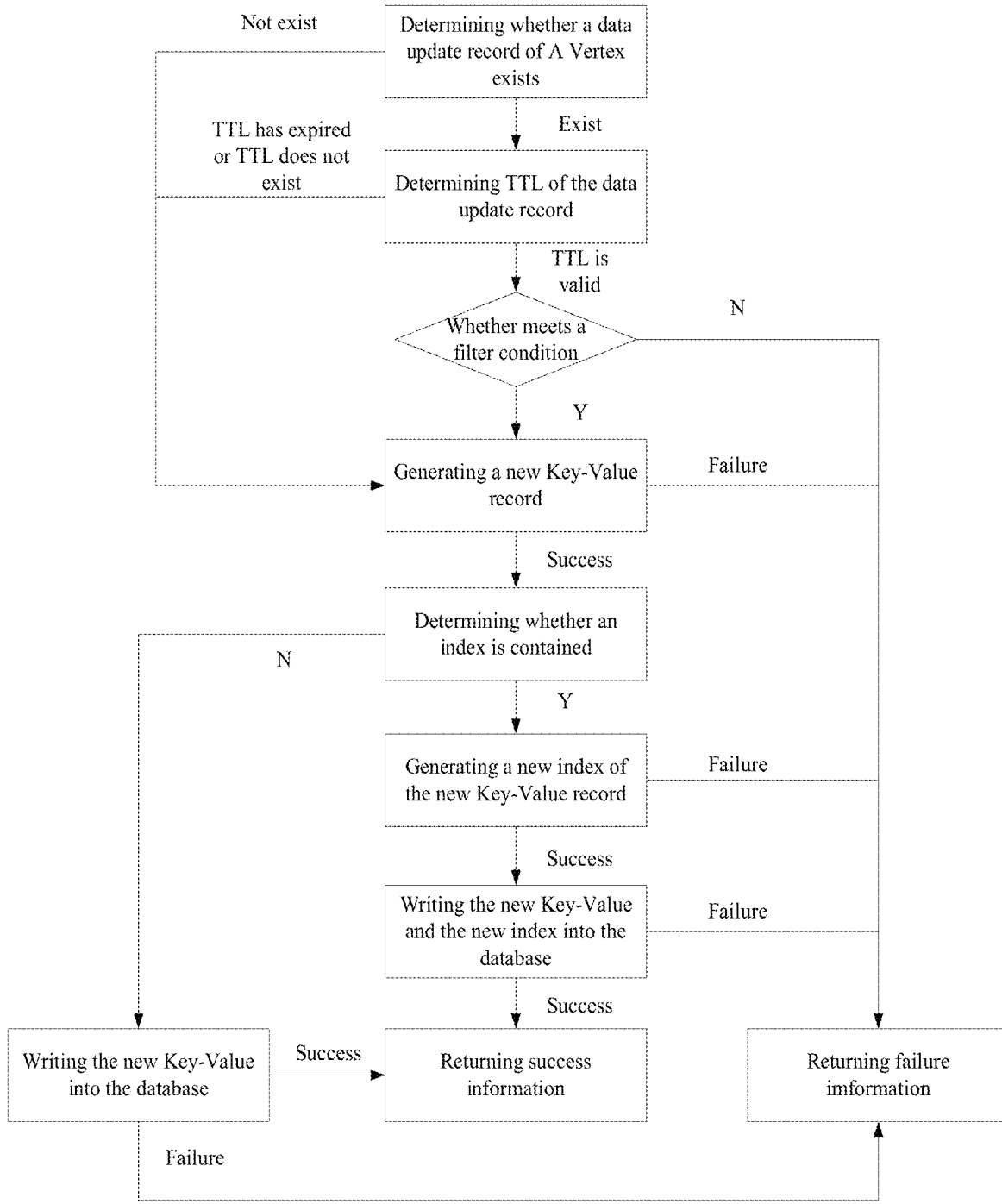
FIG. 4 is a second flowchart of a data update method of a distributed graph database according to an embodiment of the present application.

FIG. 4 is a second flowchart of a data update method of a distributed graph database according to an embodiment of the present application. As shown in FIG. 4, taking update vertex as an example, the steps of upsert vertex are as follows:

Step 1: Determining whether a data record of a vertex exists. Performing Step 4 if the data record does not exist, and performing Step 2 if the data record exists.

Step 2: Determining whether the data record includes TTL. Determining whether the data record has expired if the data record includes TTL. Performing Step 4 if the data record has expired; determining the data record is valid and performing Step 3 if the data record has not expired.

Step 3: Determining whether the data record meets a preset filter condition; reporting an error, returning failure information or returning failure information with filtered information if data record does not meet the filter condition; Performing Step 5 if the data record meets filter condition.

Step 4: Generating a new vertex index according to a tag schema of the data record and field information to be updated of data update information, inserting vertex and vertex index into corresponding graph partition.

Step 5: Generating a new Value according to the tag schema of the data record, field information to be updated of data update information and original Value. Combing original Key and the new Value into a new Key-Value record.

Step 6: Deleting an original vertex index and inserting a new vertex index of the new Key-Value record if original vertex comprises a vertex index, writing the new vertex index together with the new Key-Value record which is generated in Step 4 into database. Writing new Key-Value record into database which is generated in Step 4 while original data record does not comprise the vertex index.

Step 7: If Step 5 is successful, returning update success information and property which needs to be returned if update is successful, otherwise, returning failure information.

The entire processing step is a read_modify_write process, wherein, the reliability of data is ensured by transaction mechanism and locking mechanism.

The logic and steps of update/upsert edge is basically the same as the logic and steps of update/upsert vertex, the explanation is not repeated here.

Figure 5:
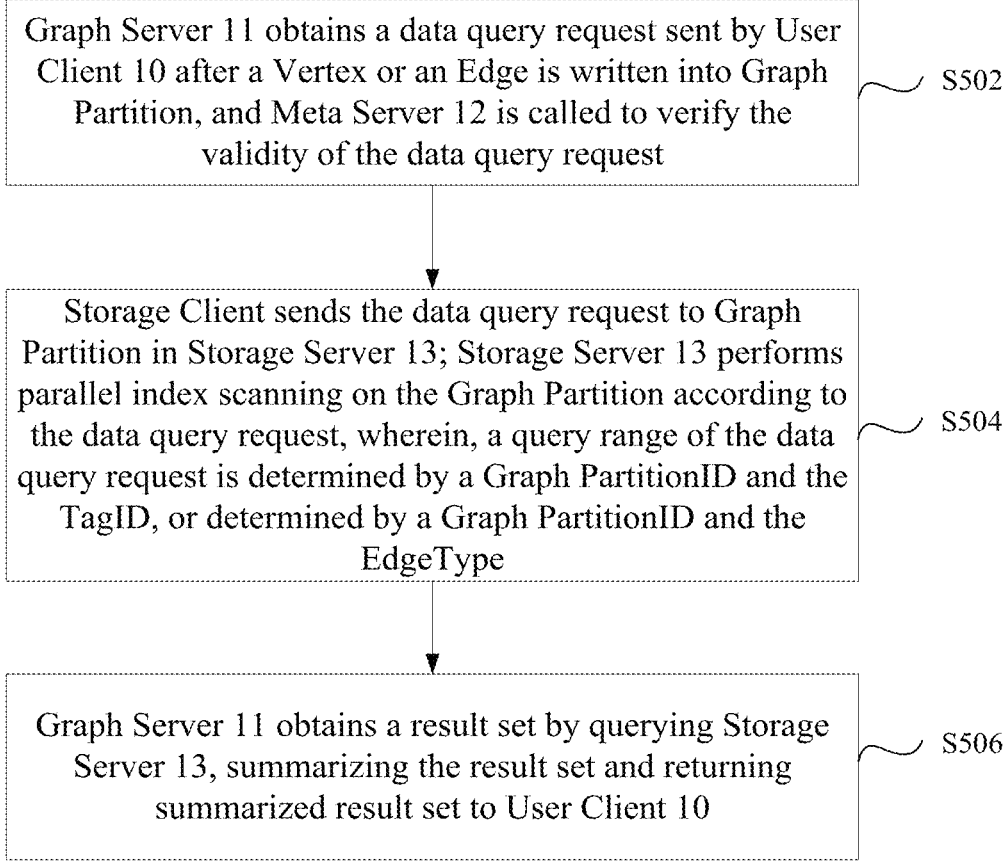
FIG. 5 is a flowchart of a distributed index query of a distributed graph database according to an embodiment of the present application.

In some embodiments, FIG. 5 is a flowchart of a distributed index query of a distributed graph database according to an embodiment of the present application. As shown in FIG. 5, the method includes steps as follows:

S502, Graph server 11 obtains a data query request sent by user client 10 after a vertex or an edge is written into graph partition, and meta server 12 is called to verify the validity of the data query request.

S504, Storage client sends the data query request to graph partition in storage server 13; storage server 13 performs parallel index scanning on the graph partition according to the data query request, wherein, a query range of the data query request is determined by a graph partitionID and the tagID, or determined by a graph partitionID and the edgetype.

S506, Graph server 11 obtains a result set by querying the storage server 13, summarizing the result set and returning summarized result set to the user client 10.

Figure 6:
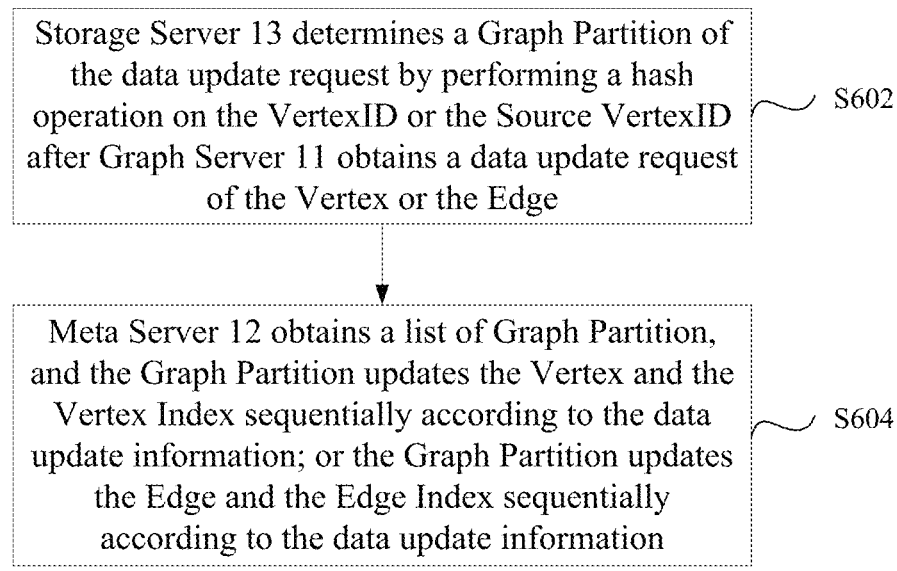
FIG. 6 is a flowchart of a distributed index update of a distributed graph database according to an embodiment of the present application.

In some embodiments, FIG. 6 is a flowchart of a distributed index update of a distributed graph database according to an embodiment of the present application. As shown in FIG. 6, the method includes steps as follows:

S602, storage server 13 determines a graph partition of the data update request by performing a hash operation on the vertexID or the source vertexID after graph server 11 obtains a data update request of the vertex or the edge;

S604, Meta server 12 obtains a list of graph partition, and the graph partition updates the vertex and the vertex index sequentially according to the data update information; or the graph partition updates the edge and the edge index sequentially according to the data update information.

Figure 7:
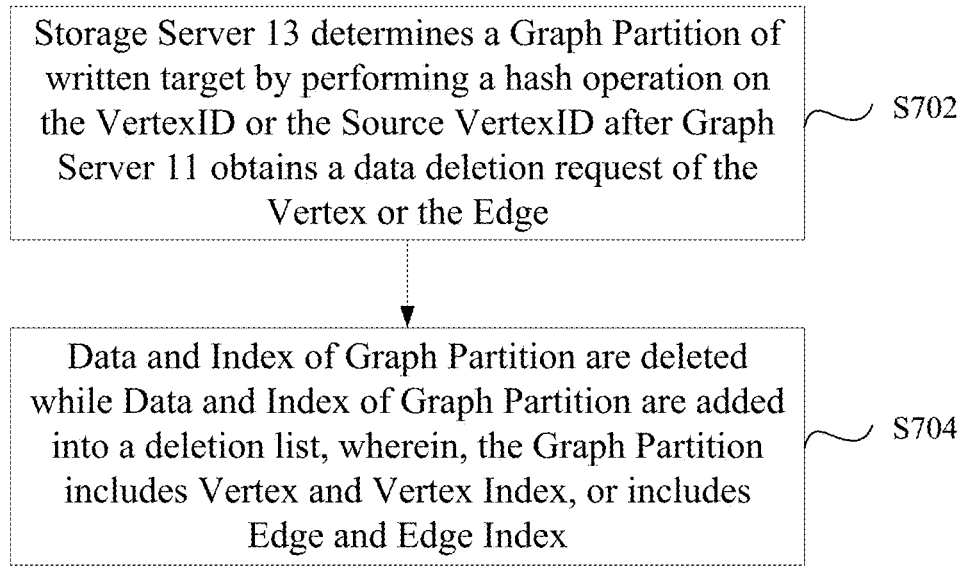
FIG. 7 is a flowchart of a distributed index deletion of a distributed graph database according to an embodiment of the present application.

In some embodiments, FIG. 7 is a flowchart of a distributed index deletion of a distributed graph database according to an embodiment of the present application. As shown in FIG. 7, the method includes as follows:

S702, Storage server 13 determines a graph partition of written target by performing a hash operation on the vertexID or the source vertexID after graph server 11 obtains a data deletion request of the vertex or the edge;

S704, Data and index of graph partition are deleted while Data and index of graph partition are added into a deletion list, wherein, the graph partition includes vertex and vertex index, or includes edge and edge index.

In some embodiments, the logic of distributed index query is: user client sends query request to graph server 11, graph server 11 calls meta server 12 to verify the validity of the query request and optimizes the query request, the optimized execution plan will be sent to graph partition of storage server 13 by storage client and storage client 13 performs parallel index scanning on the graph partition. The query range of Index scan is determined by graph partitionID and tagID or determined by graph partitionID and edgetype according to the structure of IndexKey, and only graph partition of the request is scanned this time. The optimized execution plan can efficiently find out the qualified results from the ordered property as property are sorted by bottom KV system. The result set is uniformly returned to storage server 13 after concurrent queries of each storage server 13, storage server 13 summarizes the result set and returns it to user client, the distributed query of Index has been completed. In addition, vertexID of vertex or source vertexID of edge can be identified by IndexKey while field other than filed contained in the Index in the Index scan request. property of vertex or edge can be found in same graph partition at the same time.

In some embodiments, it is inevitable that the execution of a certain graph partition fails due to hardware or network abnormalities in the process of parallel scan. graph server 11 can specifically locate the failed graph partition and the reason for the failure by Error Code. The specific process method for the overall result set is determined by graph server 11.

In some embodiments, the insertion of distributed index query is: the insertion of Index depends on the insertion of vertex or edge. vertex index corresponding to vertex Data or edge index corresponding to edge Data will be automatically generated while vertex or edge is inserted. The target graph partition to be written is determined by performing a hash operation on vertexID. graph server 11 obtains the list of target graph partition by meta server 12 and sends a write request to the corresponding graph partition. It can be seen that the graph partition in storage server 13 can perform write processing parallel. Data and Index can be written into each graph partition by atomic operation. In addition, the consistency processing of concurrent write processing of multiple graph partition is controlled by transaction mechanism. For upsert processing, the main logic of Index is querying old Index→deleting old Index if old Index exists→inserting a new Index, and all operation need to be ensure atomicity.

In some embodiments, the update of distributed index query is: the update of Index depends on the update of vertex or edge. The target graph partition which contains data to be updated and Index is determined by performing a hash operation on the vertexID of the vertex or the source vertexID of the edge while the vertex or the edge is updated. graph server 11 sends update request to the target graph partition to perform update processing. graph partition distributed in different storage server 13 can perform parallel operation as the target graph partition may be distributed in different storage server 13.

In some embodiments, the deletion of distributed index query is: vertex index or edge index will also be deleted while corresponding vertex or edge is deleted. Data and Index can be deleted by atomic operation in the deletion process as vertex and corresponding vertex index or edge and corresponding edge index are stored into a same graph partition. In the deletion process, data which meets the deletion condition can be obtained by vertexID or edgetype, the target IndexKey to be deleted can be constructed by the obtained data, IndexKey is added into the deletion list, and atomic deletion processing is performed.

In some embodiments, vertex or edge can be evenly distributed into all graph partition by performing a hash operation on vertexID. Index data can be evenly distributed into all graph partition as Index and its corresponding vertex or edge are stored in same graph partition. Therefore, the problem of data skew can be avoided.

In some embodiments, any vertex or edge which meets the judgment condition will be retrieved at most of time as Index query often does not target certain vertex or edge. Therefore, all graph partition can be parallel queried while distributed index parallel queried, and the retrieval efficiency is effectively improved.

In some embodiments, further calculation will be performed by vertex or edge if the vertex or edge which meets condition by distributed parallel query of Index. Further calculation of vertex or edge can be performed in the current graph partition as index of vertex or index of edge is distributed into a same graph partition. Therefore, the unnecessary network overhead or other resource overhead caused by the calculation of cross-storage server 13 or cross-graph partition can be avoided.

In addition, in combination with the data processing method of a distributed graph database in the above-mentioned embodiments, the present embodiment of the present application provides a storage medium to perform the method.

In one embodiment, the present application provides a computing device, and the computing device can be a terminal. The computing device includes a processor, a memory, a network interface, a display screen and an input device which are connected by system bus. The processor of the computing device is used to provide computing and control functions. The memory of the computing device includes a non-volatile storage medium and internal memory. The non-volatile storage medium is used to store an operation system and computer program. The internal memory is used to provide an operation environment for the operation system and computer program which are stored in the non-volatile storage medium. The network interface of the computing device is used to communicate with external terminal by network. The computer program is used to perform a data processing method of a distributed graph database while it is executed by processor. The display screen of the computing device can be a liquid crystal display screen or an electronic ink display screen. The input device of the computing device may be a touchable layer covered on the display screen, it may also be a button, a trackball, a touch pad provided on the housing of the computing device, and it may also be a keyboard, a touch pad, a mouse which are external.

Figure 8:
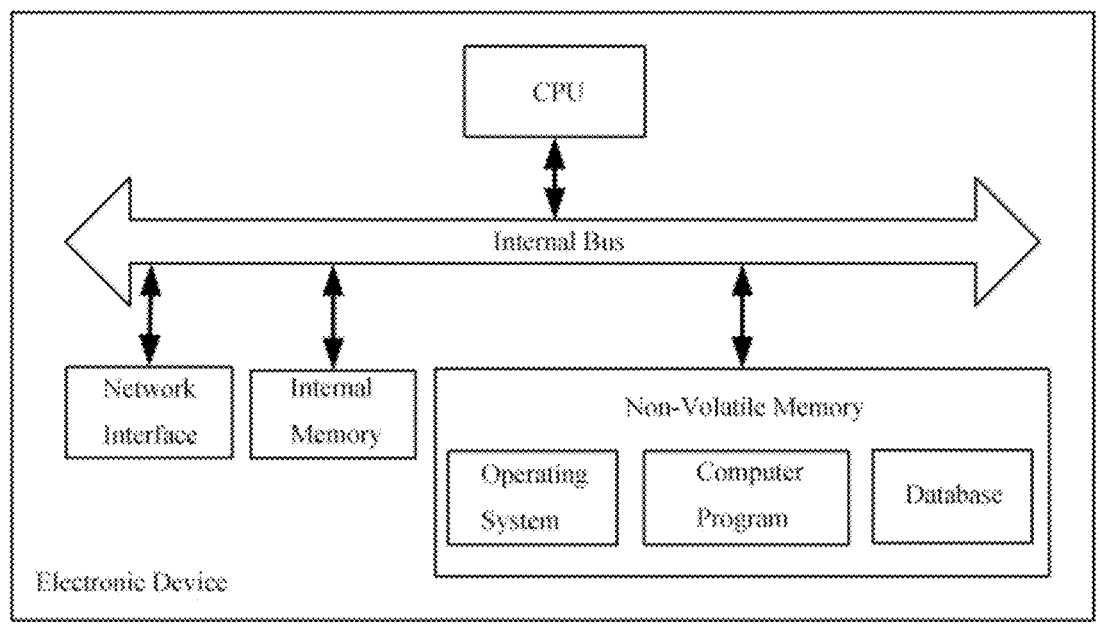
FIG. 8 is a schematic diagram of the internal structure of an electronic device according to an embodiment of the present application.

In one embodiment, FIG. 8 is a schematic diagram of the internal structure of an electronic device according to an embodiment of the present application. As shown in FIG. 8, the present application provides an electronic device, the electronic device may be server, and its internal structure diagram may be shown in FIG. 8. The electronic device includes a processor, a network interface, an internal memory and a non-volatile storage medium which are connected by internal bus. The non-volatile storage medium stores an operation system, computer program and database. The processor of the computing device is used to provide computing and control functions. The network interface of the computing device is used to communicate with external terminal by network. The internal memory is used to provide an operation environment for the operation system and computer program which are stored in the non-volatile storage medium. The computer program is used to perform a data processing method of a distributed graph database while it is executed by processor. The database is used to store data.

For persons of ordinary skill in the art, it is understood that, the structure shown in FIG. 8 is only a block diagram of part of the structure related to the solution of the present application, and does not constitute a limitation on the electronic device to which the solution of the present application is applied. The specific electronic device may include more or fewer components than shown in the drawing, or may combine certain components, or may have a different component arrangement.

For persons of ordinary skill in the art, it is understood that, all or part of the processes in the method in the above-mentioned embodiments can be performed by relevant hardware which is instructed by computer program. The computer program can be stored in one non-volatile computer-readable storage medium. The computer program can include processes of method in the above-mentioned embodiments. Wherein, the memory, storage, database or other medium referred in the embodiments provided in the present application may include non-volatile and/or volatile memory. Non-volatile memory can include Read-Only Memory (ROM), Programmable Read-Only Memory (PROM), Electrically Programmable Read-Only Memory (EPROM), Electrically Erasable Programmable Read-Only Memory (EEPROM) or flash memory. Volatile memory can include Random Access Memory (RAM) and external Cache. As an illustration and not a limitation, RAM is available in many forms, such as Static Random-Access Memory (SRAM), Dynamic Random Access Memory (DRAM), Synchronous Dynamic Random Access Memory (SDRAM), Double Data Rate Synchronous Dynamic Random Access Memory (DDRSDRAM), Enhanced synchronous Dynamic Random Access Memory (ESDRAM), Synchlink Dynamic Random Access Memory (SLDRAM), Rambus Direct Random Access Memory (RDRAM), Direct Rambus Dynamic Random Access Memory (DRDRAM), Rambus Dynamic Random Access Memory (RDRAM) and the like.

For persons of ordinary skill in the art, it is understood that, the technical features of the above-mentioned embodiments can be combined arbitrarily. In order to make the description concise, all possible combinations of the various technical features in the above-mentioned embodiments are not described. However, as long as there is no contradiction in the combination of these technical features, it should be regarded as the scope described in the description.

The above-mentioned embodiments only describe some implementation of the present application, the description is more specific and detailed, but it should not be understood as a limitation on the scope of the present application. It should be noted that, for persons of skill in the art, several modifications and improvements can be made without departing from the concept of the present application which shall fall within the protection scope of the present application. Therefore, the protection scope of the present application shall be subject to the appended claims.

What is claimed is:

1. A data processing method of a distributed graph database, comprising:
    obtaining a write request of a vertex or an edge;
    generating a vertex index of the vertex according to a tag identity (tagID) of the vertex, wherein, the vertex comprises a vertex identity (vertexID) and the tagID;
    writing the vertex and the vertex index into a graph partition by performing a hash operation on the vertexID and storing the vertex and the vertex index in the graph partition;
    generating an edge index of the edge according to an edgetype of the edge, wherein, the edge comprises a source vertexID and the edgetype;
    writing the edge and the edge index into the graph partition by performing a hash operation on the source vertexID and storing the edge and the edge index in the graph partition;
    obtaining a data update request of the vertex or the edge, wherein, the data update request comprises a data record to be updated and data update information;
    detecting whether the data record is valid, wherein the step of detecting whether the data record is valid comprises:
    detecting whether the data record exists;
    determining whether the data record has expired if the data record exists;
    determining the data record is valid if the data record exists and the data record has not expired;
    determining the data record is invalid if the data record does not exist or the data record has expired;
    returning update failure information if the data record is invalid;
    updating the vertex or the edge according to the data update information if the data record is valid,
    wherein the step of updating the vertex or the edge according to the data update information if the data record is valid comprises:
    determining whether the data record is valid;
    determining whether the data record meets a preset filter condition if the data record is valid;
    returning filtering failure information if the data record does not meet the preset filter condition; and
    updating the vertex or the edge according to the data update information if the data record meets the preset filter condition; and
    wherein after the step of writing the vertex and the vertex index into the graph partition or the step of the edge and the edge index are written into the graph partition, the method further comprises:
    obtaining a data query request sent by an application programming interface (API) client, verifying the validity of the data query request by calling a metadata server, sending the data query request to a graph partition in a storage server by a storage client, performing parallel index scanning on the graph partition according to the data query request, wherein, a query range of the data query request is determined by a graph partitionID and the tagID, or determined by a graph partitionID and the edgetype; and
    obtaining result set by querying the storage server, summarizing the result set and returning summarized result set to the API client.

2. The method according to claim 1, wherein, the step of generating a vertex index of the vertex according to a tagID of the vertex and the step of generating an edge index of the edge according to an edgetype of the edge comprise:
    creating a vertex index identity (vertex indexID) according to the tagID on the basis of a tag schema, wherein, the vertex index comprises the vertex indexID, a graph partition identity (graph partitionID), a data type and a property;
    creating an edge index identity (edge indexID) according to the edgetype on the basis of an edge schema, wherein, the edge index comprises the edge indexID, a graph partitionID, a data type and a property.

3. The method according to claim 1, wherein, the step of obtaining a data update request of a vertex or an edge comprises:
    determining a graph partition of the data update request by performing a hash operation on the vertexID or the source vertexID after obtaining the data update request of the vertex or the edge; and
    the step of updating the vertex or the edge according to the data update information if the data record is correct further comprising:
    updating the vertex and the vertex index by the graph partition sequentially according to the data update information; or
    updating the edge and the edge index by the graph partition sequentially according to the data update information.

4. The method according to claim 3, wherein, before the step of updating the vertex or the edge according to the data update information, the method further comprises:
    detecting whether vertex index information or edge index information exists in the data update request;
    updating the vertex index information or the edge index information synchronously if the vertex index information or the edge index information exists;
    skipping updating the vertex index information or the edge index information if the vertex index information or the edge index information does not exist.

5. The method according to claim 1, wherein, the data update request comprises the data record to be updated and data update information, and the method comprises:
    if the data record is an edge update record, when it is determined that the edge has a related edge, updating data of the edge according to the data update information; and
    updating the related edge synchronously by the edge update record.

6. The method according to claim 1, wherein, the step of performing parallel index scanning on the graph partition according to the data query request comprises:

generating an error code by the storage server when an error occurs in performing parallel index scanning on the graph partition;

locating the graph partition where the error occurs in the index scan according to the error code.

7. The method according to claim 1, wherein, after the step of writing the vertex and the vertex index into a same graph partition or the step of writing the edge and the edge index into a same graph partition, the method further comprises:

obtaining a data deletion request;

determining a graph partition for the data deletion request by performing a hash operation on the vertexID of the vertex or the source vertexID of the edge of the data deletion request;

obtaining preset deletion data in the data deletion request in the graph partition according to the vertexID of the vertex or the edge type of the edge; and performing atomic deletion operation on the preset deletion data.

* * * * *